Figure 1:
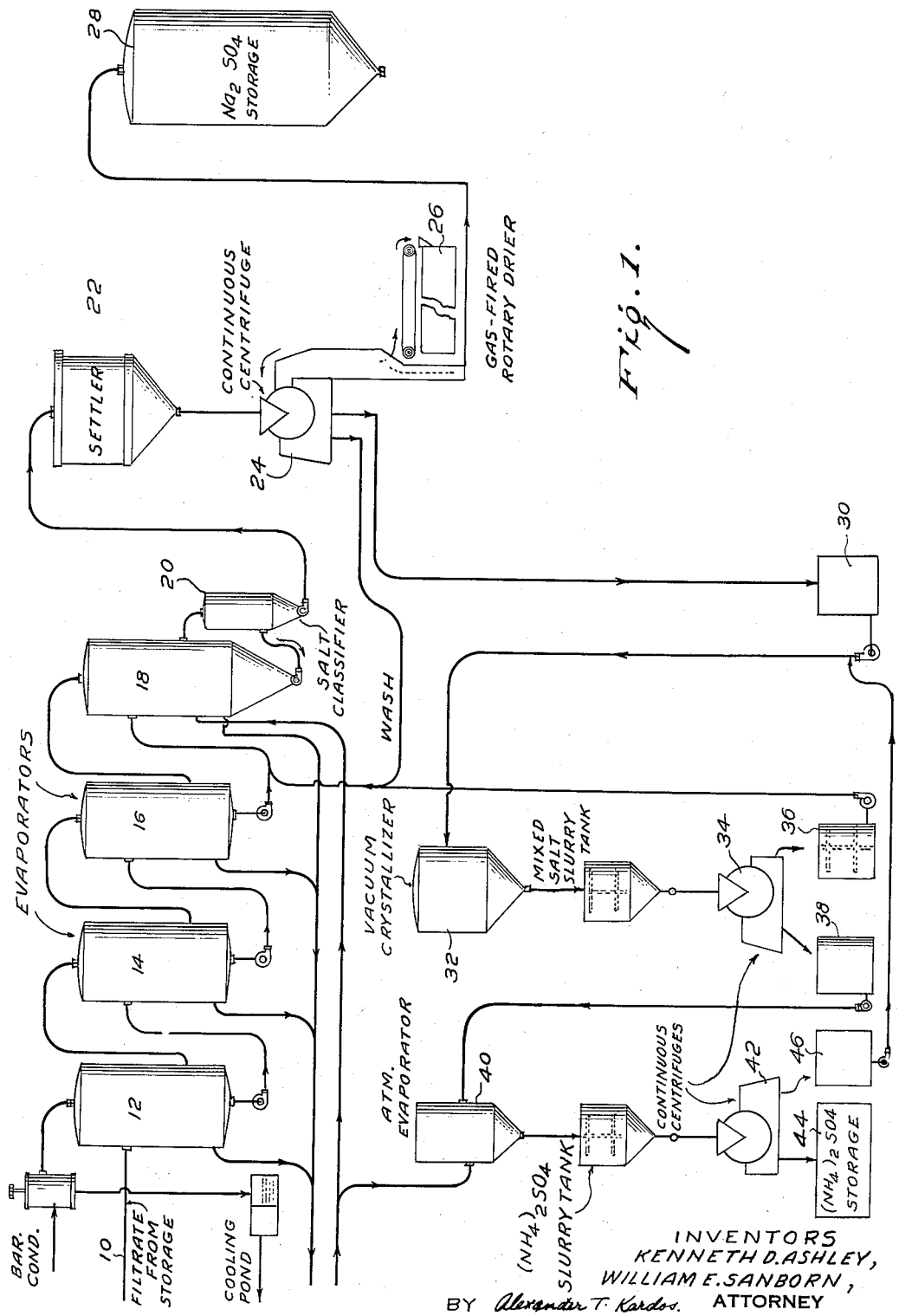

United States Patent Office 2,739,044
Patented Mar. 20, 1956

2,739,044

RECOVERY OF AMMONIUM AND SODIUM SULFATES FROM WASH WATERS

Kenneth D. Ashley, Stamford, and William E. Sanborn, Rowayton, Conn., assignors to American Cyanamid Company, New York, N. Y., a corporation of Maine Application June 25, 1953, Serial No. 363,956

4 Claims. (Cl. 23—302)

This invention relates to improved methods of recovering sodium sulfate and ammonium sulfate from dilute aqueous solutions and more particularly relates to such recovery methods applied to the dilute aqueous wash water filtrates obtained in the manufacture of silica-alumina catalysts.

In the manufacture of silica-alumina catalysts by processes such as described in greater particularity in U. S. Patent 2,478,519, issued August 9, 1949, large quantities of sodium silicate, sulfuric acid, aluminum sulfate and ammonia are used in the formation of the silica and alumina gels. During the formation of the gels, sodium sulfate and ammonium sulfate are naturally formed and must be removed from the gel catalyst by washing. Large volumes of dilute aqueous solutions of sodium sulfate and ammonium sulfate are consequently obtained from such washings and it is a principal object of the present invention to utilize these wash waters as advantageously as possible under the particular circumstances.

In many cases the economics of the situation have been such that the wash waters were merely run to waste into the nearest stream or other body of water. However, such tactics have become more and more inadvisable, particularly in view of the stream pollution problems created by the ever-increasing amounts of such materials being run to waste and by the objections of nearby municipalities to such procedures. It is, therefore, a further principal object of the present invention to provide improved methods of recovering such sulfates to avoid running them to waste and to alleviate the stream pollution problems.

Additionally, these sulfates, although not relatively expensive, do possess commercial value and it is a still further principal object of the present invention to provide methods of recovering such sulfates whereby the manufacture of such catalysts is made more efficient and economical on an overall economic basis.

We have found that these objects, as well as other objects which will appear hereinafter, may be obtained by concentrating the dilute aqueous wash water filtrates at relatively elevated temperatures to a point sufficient to crystallize out of solution a portion of the sodium sulfate but insufficient to crystallize any ammonium sulfate out of solution. This crystallized sodium sulfate may then be recovered in relatively pure form. The remaining solution which now contains a higher ratio of ammonium sulfate to sodium sulfate than originally present may be cooled to a low enough temperature and concentrated under vacuum whereby a mixture of a double salt of sodium sulfate and ammonium sulfate crystallizes out of solution. This mixed salt is separated and recycled to the original aqueous filtrate at a point prior to the removal of the crystallized sodium sulfate. The remaining solution which now possesses an even higher ratio of ammonium sulfate to sodium sulfate is then heated and concentrated at relatively elevated temperatures. Such an opertaion, however, due to the change of proportions of the constituents, now results in a crystallization of a portion of the ammonium sulfate out of solution prior to any crystallization of the sodium sulfate, whereby the ammonium sulfate may be separated and collected in relatively pure form. The remaining solution may then be separated and recycled, if desired, for example, to a point of the operation prior to the separation of the double salts.

In this way, relatively pure sodium sulfate, as well as relatively pure ammonium sulfate, are recovered from the dilute aqueous wash water and, at the same time, any waste discharged to the streams or other bodies of water will be sufficiently pure to avoid stream pollution problems and the objection of nearby municipalities.

Figure 2:
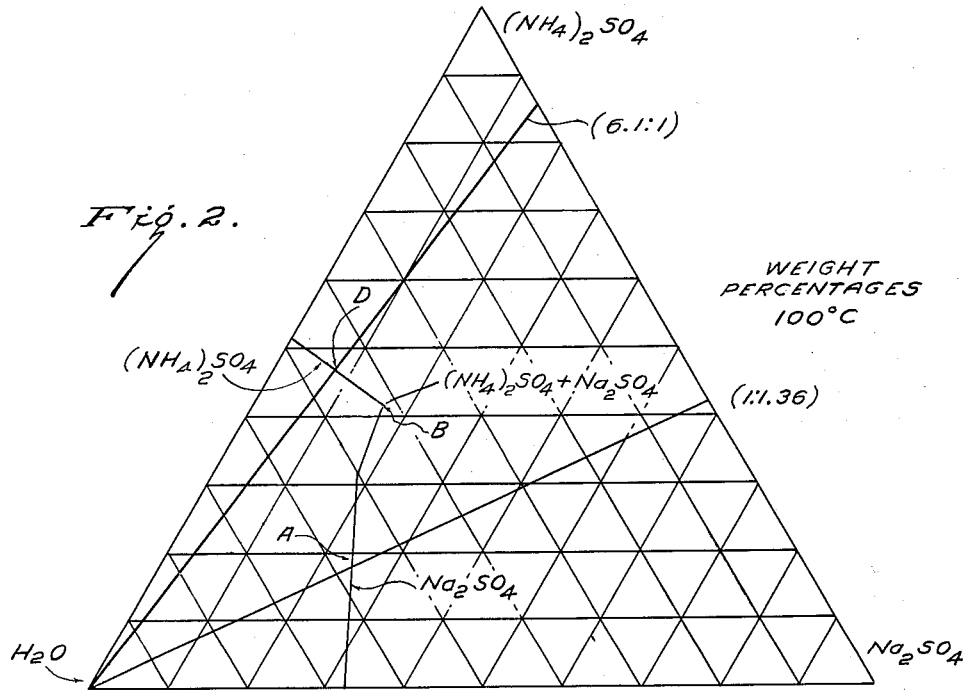
Figure 3:
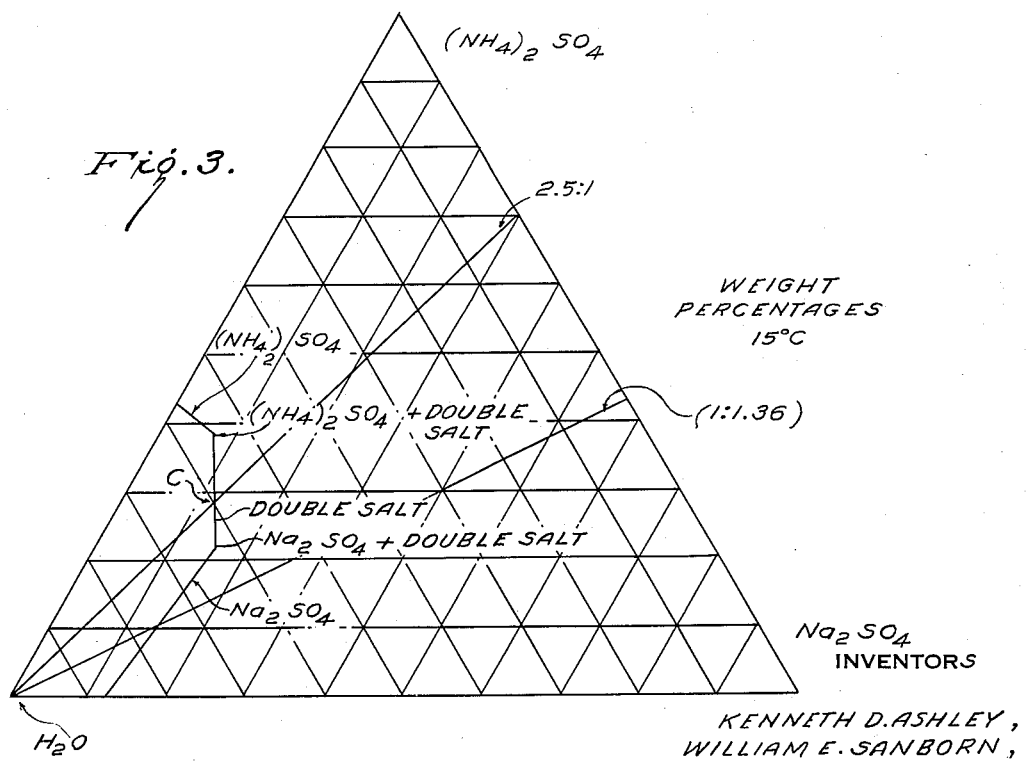

Other features and advantages will appear in the accompanying drawings and the following specification wherein we have illustrated and described a preferred form of process embodying our inventive concept. However, it is to be understood that our invention is not to be construed as limited to the specific process disclosed nor to the particular equipment used except as determined by the scope of the appended claims. With reference to the accompanying drawings, Figure 1 is a schematic showing of the preferred embodiment of the present invention, Figure 2 is a sodium sulfate-ammonium sulfate-water phase diagram showing the weight percentages at 100° C., and Figure 3 is a sodium sulfate-ammonium sulfate-water phase diagram showing the weight percentages at 15° C.

In the embodiment of the invention shown in the drawings, the dilute aqueous filtrate 10 coming from the filters or other separation equipment used in the production of the silica-alumina gels contains the ammonium sulfate and sodium sulfate in varying proportions depending on many factors. One particular sample of a filtrate was analyzed and was found to contain an ammonium sulfate:sodium sulfate weight ratio of approximately 1:1.36 and this particular ratio will be employed to describe more specifically the details of the present invention. It is to be pointed out, however, that such a value has been selected merely as illustrative of the inventive concept and is not to be construed as limitative thereof, inasmuch as very many other ratios are possible, depending upon the specific operating conditions.

The filtrate is received from such a catalyst manufacturing process and analyzed 1.34 tons of ammonium sulfate and 1.82 tons of sodium sulfate (1:1.36 ratio) in approximately 150 tons of water per hour. The filtrate is passed through any type of concenration equipment, such as a thermo-compression evaporator or, as shown in Figure 1, multi-effect evaporators 12, 14, 16, 18, which may be operated at temperatures respectively of approximately 51° C.; 66° C.; 82° C.; and 100° C. and at correspondingly decreased pressures.

During such a concentration, the sodium sulfate, being in greater concentration than the ammonium sulfate and, additionally, having a considerably lower solubility in water, crystallizes out first, prior to any crystallization of the ammonium sulfate. Such crystallization follows and is governed by the three component sodium sulfate-ammonium sulfate-water phase diagram at 100° C. shown in Figure 2. Crystallization of the sodium sulfate starts at intersection point A and continues in the direction of intersection point B. However, the control over the evaporators is such that the concentration of the solution is stopped just prior to reaching intersection point B whereby only sodium sulfate crystallizes out and substantially no ammonium sulfate is crystallized.

The crystallized sodium sulfate slurry may, if desired, be passed through a salt classifier 20 which permits the large-size crystals to continue onwardly for processing but separates the fine crystals and returns them to the evaporators to permit their build-up into desirable large size crystals. The large-size crystals passing through the classifier may be pumped through a settler 22 and a continuously-operated centrifuge 24 whereby the sodium sulfate is separated and then passed onwardly to a drier, such as a gas-fired rotary type 26, wherein the crystals are dried prior to being placed in a storage bin 28.

A small amount of wash water may be employed to wash the sodium sulfate crystals and this wash may then be recycled back to the evaporators, as shown in Figure 1. This is represented in the table, which will be described more fully hereinafter, as wash No. 1.

The mother liquor from which the sodium sulfate crystals have been removed then goes to a receiving tank 30 wherein the sodium sulfate:ammonium sulfate weight ratio is found to be approximately 1 to 2.5, due to the decrease in the amount of sodium sulfate. The mother liquor is then pumped to a vacuum crystallizer 32 equipped with a booster, if necessary, wherein it is cooled to a low enough temperature and concentrated under vacuum to remove most of the remaining sodium sulfate by precipitating out quantities of the double salt of sodium sulfate and ammonium sulfate. The crystallization follows and is governed by the three component sodium sulfate-ammonium sulfate-water phase diagram shown in Figure 3 which, primarily for illustrative purposes, has been taken at 15° C. It is to be realized, however, that other temperatures are possible, provided the double salt crystallizes out of solution at that temperature and pressure for the particular concentration of sulfates present. For the purpose of this invention, it has been found that a temperature range of from about 0° C. to about 25° C. defines the commercially operable field.

The composition of the double salt has been found to be approximately 48% ammonium sulfate by weight and 52% sodium sulfate and it is to be appreciated that the removal of such a salt from the solution will ultimately result in a much higher proportion of ammonium sulfate therein.

A continuous centrifuge 34 may be employed to separate the double salt which is then delivered to a receiving tank 36 equipped with heating means (not shown) and heated prior to being recycled to the quadruple effect evaporators to be added to the dilute aqueous filtrate 10 undergoing concentration therein, whereby the percentage of the sodium and ammonium sulfates therein is increased considerably.

The mother liquor from which the mixed salts have been removed and which now possesses an even higher ammonium sulfate:sodium sulfate weight ratio, on the order of approximately 6.1:1, may be delivered to a receiving tank 38 and pumped to a third evaporating stage which may take the form of an atmospheric evaporator 40. This evaporation takes place at atmospheric pressure and at approximately 105° C. and consequently the phase diagram of Figure 2 is again controlling with the governing ratio of ammonium sulfate to sodium sulfate being about 6.1:1. Reference to Figure 2 reveals that ammonium sulfate will be precipitated out initially (note intersection point D) prior to any separation of sodium sulfate. The evaporation is so controlled that it is continued up to a point just short of intersection point B, whereat sodium sulfate would also start precipitating out, and consequently only relatively pure ammonium sulfate is obtained at this point.

It is, of course, apparent that this concentration is not necessarily carried out at atmospheric pressure but that pressures less than atmospheric may be used with correspondingly decreased temperatures and that pressures above atmospheric may be used with correspondingly increased pressures.

A continuous centrifuge 42 separates the crystallized ammonium sulfate and delivers the same to storage bins 44, after drying or other processing. The mother liquor may be delivered to a receiving tank 46 and then may be recycled, for example, to be mixed with the mother liquor leaving tank 30.

The following table sets forth the weights of materials per hour processed, the percentage compositions thereof and the approximate temperatures at the various stages of the operation.

Table

| Material | Tons Per Hour | | | Composition, Percent | | Temp., °C. |
|---|---|---|---|---|---|---|
| | $Na_2SO_4$ | $(NH_4)_2SO_4$ | $H_2O$ | $Na_2SO_4$ | $(NH_4)_2SO_4$ | |
| Dilute Filtrate | 1.82 | 1.34 | 150 | 1.19 | 0.88 | 29 |
| Saturated Liquor | 1.82 | 1.34 | 4.14 | 25.0 | 18.0 | 72 |
| $Na_2SO_4$ Slurry | 3.52 | 2.16 | 2.21 | 34% Crystals | | 85–100 |
| Mother Liquor-Tank 30 | 0.85 | 2.16 | 2.21 | 16.5 | 41.1 | 100 |
| M. L. Vac. Cryst. 32 | 1.20 | 3.04 | 3.13 | 16.5 | 41.1 | 100 |
| Mixed Salt Slurry | 0.85 | 0.82 | 0.10 | 48 | 46.3 | 15 |
| Mother Liquor Tank 38 | 0.35 | 2.22 | 3.16 | 6.2 | 39.4 | 15 |
| Mother Liquor Tank 46 | 0.35 | 0.88 | 0.92 | 16.5 | 41.1 | 100 |
| Mixed Salt Tank 36 | 0.85 | 0.82 | 1.7 | 25.0 | 24.0 | 90–100 |
| Wash 1 | 0.85 | | 1.8 | 32.0 | | 72 |
| $Na_2SO_4$ to Storage | 1.82 | | | 100 | | |
| $(NH_4)_2SO_4$ to Storage | | 1.34 | | | 100 | |

These values are, of course, merely typical of one particular installation used to recover the ammonium and sodium sulfates from a specific silica-alumina catalyst manufacturing operation. The principles of the present invention are naturally applicable to dilute aqueous wash water wastes from other sources and of other concentrations. The dilute aqueous liquor may enter the process at other initial temperatures and it is apparent that other temperature and pressure ranges for the evaporation steps are capable of use.

While we have shown and described what we believe to be a preferred embodiment of our invention in the matter of simplicity, equipment, ease of operation, etc., it will be obvious that the details of such an embodiment may be more or less modified within the scope of the appended claims without departures from the principle involved or material sacrifice of the advantages of the preferred concept.

We claim:

1. A method of recovering sodium sulfate and ammonium sulfate from a dilute aqueous solution containing the same which comprises concentrating said dilute aqueous solution at elevated temperatures and adjusting the sodium sulfate-ammonium sulfate ratio thereof to a point where a portion of the sodium sulfate will crystallize out of solution at 100° C. without crystallizing out any of the ammonium sulfate and separating the crystallized sodium sulfate from its mother liquor; cooling said mother liquor to a temperature of from about 0° C. to about 25° C. whereby a double salt of sodium sulfate and ammonium sulfate crystallizes out of solution; separating said double salt from its mother liquor; concentrating the last-mentioned mother liquor at elevated temperatures to a point sufficient to crystallize a portion of the ammonium sulfate out of the solution but not enough to crystallize any sodium sulfate out of solution; and separating the crystallized ammonium sulfate from its mother liquor.

2. A method of recovering sodium sulfate and ammonium sulfate from a dilute aqueous solution containing the same which comprises concentrating said dilute aqueous solution at elevated temperatures and adjusting the sodium sulfate-ammonium sulfate ratio thereof to a point where a portion of the sodium sulfate will crystallize out of solution at 100° C. without crystallizing out any of the ammonium sulfate and separating the crystallized sodium sulfate from its mother liquor; cooling said mother liquor to a temperature of from about 0° C. to about 25° C. whereby a double salt of sodium sulfate and ammonium sulfate crystallizes out of solution; separating said double salt from its mother liquor and recycling the same to the dilute aqueous solution undergoing concentration; concentrating the last-mentioned mother liquor at elevated temperatures to crystallize a portion of the ammonium sulfate out of the solution but not enough to crystallize any sodium sulfate out of solution; separating the crystallized ammonium sulfate from its mother liquor; and recycling the last-mentioned mother liquor to the solution being cooled to separate the double salt.

3. A method of recovering sodium sulfate and ammonium sulfate from dilute aqueous wash water used in washing silica-alumina gels which comprises concentrating said wash water at elevated temperatures of from about 51° C. to about 100° C. and adjusting the sodium sulfate-ammonium sulfate ratio thereof to a point where a portion of the sodium sulfate will crystallize out of solution at 100° C. without crystallizing out any of the ammonium sulfate and separating the crystallized sodium sulfate from its mother liquor; cooling said mother liquor under vacua to a temperature of about 15° C. and concentrating the same whereby a double salt of sodium sulfate and ammonium sulfate crystallizes out of solution; separating said double salt from its mother liquor; concentrating the last-mentioned mother liquor at elevated temperatures to a point sufficient to crystallize a portion of the ammonium sulfate out of the solution but not enough to crystallize any sodium sulfate out of solution; and separating the crystallized ammonium sulfate from its mother liquor.

4. A method of recovering sodium sulfate and ammonium sulfate from dilute aqueous wash water used in washing silica-alumina gels which comprises concentrating said wash waters at elevated temperatures of from about 51° C. to about 100° C. and adjusting the sodium sulfate-ammonium sulfate ratio thereof to a point where a portion of the sodium sulfate will crystallize out of solution at 100° C. without crystallizing out any of the ammonium sulfate and separating the crystallized sodium sulfate from its mother liquor; cooling said mother liquor to a temperature of about 15° C. and concentrating the same whereby a double salt of sodium sulfate and ammonium sulfate crystallizes out of solution; separating said double salt from its mother liquor and recycling the same to the wash water undergoing concentration; concentrating the last-mentioned mother liquor double salt at elevated temperatures to a point sufficient to crystallize a portion of the ammonium sulfate out of the solution but not enough to crystallize any sodium sulfate out of solution; separating the crystallized ammonium sulfate from its mother liquor; and recycling the last-mentioned mother liquor to the solution being cooled to separate the double salt.

No references cited.